(12) United States Patent
Kimbrell et al.

(10) Patent No.: US 8,565,571 B2
(45) Date of Patent: Oct. 22, 2013

(54) MODULAR, RESEALABLE FIBER OPTIC HIGH FIBER COUNT PACKAGING

(75) Inventors: Eddie Kimbrell, Dacula, GA (US); Ted Lichoulas, Simpsonville, SC (US); Kyle Marchek, Greer, SC (US)

(73) Assignee: AFL Telecommunications LLC, Spartanburg, SC (US)

( * ) Notice: Subject to any disclaimer, the term of this patent is extended or adjusted under 35 U.S.C. 154(b) by 192 days.

(21) Appl. No.: 13/061,381

(22) PCT Filed: Jul. 21, 2010

(86) PCT No.: PCT/US2010/042735
§ 371 (c)(1),
(2), (4) Date: Feb. 28, 2011

(87) PCT Pub. No.: WO2011/011509
PCT Pub. Date: Jan. 27, 2011

(65) Prior Publication Data
US 2011/0158600 A1 Jun. 30, 2011

Related U.S. Application Data

(60) Provisional application No. 61/227,223, filed on Jul. 21, 2009.

(51) Int. Cl.
*G02B 6/36* (2006.01)
(52) U.S. Cl.
USPC .......................................................... 385/135
(58) Field of Classification Search
None
See application file for complete search history.

(56) References Cited

U.S. PATENT DOCUMENTS

| 4,423,918 | A  | * | 1/1984  | Filreis et al. ................... 439/412 |
| 4,428,645 | A  | * | 1/1984  | Korbelak et al. ............. 385/135 |
| 4,733,935 | A  | * | 3/1988  | Gandy ............................. 385/69 |
| 4,799,757 | A  | * | 1/1989  | Goetter ......................... 385/135 |
| 4,820,007 | A  | * | 4/1989  | Ross et al. ..................... 385/135 |
| 5,093,885 | A  | * | 3/1992  | Anton ............................ 385/134 |
| 5,495,549 | A  |   | 2/1996  | Schneider et al. |
| 5,631,993 | A  | * | 5/1997  | Cloud et al. .................. 385/135 |
| 5,782,358 | A  |   | 7/1998  | Walker |
| 6,424,761 | B1 | * | 7/2002  | Kordahi et al. ................ 385/25 |
| 7,136,555 | B2 | * | 11/2006 | Theuerkorn et al. .......... 385/100 |
| 2005/0036751 | A1 | * | 2/2005  | Young et al. ................... 385/100 |
| 2005/0213921 | A1 | * | 9/2005  | Mertesdorf et al. .......... 385/135 |
| 2006/0127026 | A1 | * | 6/2006  | Beck .............................. 385/135 |
| 2006/0291792 | A1 | * | 12/2006 | Vo et al. ........................ 385/135 |
| 2007/0047895 | A1 |   | 3/2007  | Parikh et al. |
| 2011/0091170 | A1 | * | 4/2011  | Bran De Leon et al. ...... 385/100 |
| 2012/0002934 | A1 | * | 1/2012  | Kimbrell et al. .............. 385/135 |

OTHER PUBLICATIONS

International Search Report PCT/US2010/042735, Sep. 10, 2010.

* cited by examiner

*Primary Examiner* — Mike Stahl
(74) *Attorney, Agent, or Firm* — Sughrue Mion, PLLC

(57) ABSTRACT

A conductor packaging apparatus for packaging a plurality of conductors includes an outer shell having two halves, and an inner shell removably disposed between the halves of the outer shell. The inner shell has two halves and a plurality of connector attachments disposed on an inner surface of at least one of the halves of the inner shell wherein the two halves of the outer shell are movably attached to one another between a closed position in which the connector attachments are enclosed by both the inner shell and the outer shell, and an open position in which the two halves of the outer shell are apart from one another.

14 Claims, 18 Drawing Sheets

MODULAR, RESEALABLE FIBER OPTIC HIGH FIBER COUNT PACKAGING

CROSS-REFERENCE TO RELATED APPLICATION

The present application is related to International Application No. PCT/US2010/022037 filed on Jan. 26, 2010 based on U.S. Application No. 61/147,265. The present application claims priority to U.S. Application No. 61/227,223 filed on Jul. 21, 2010. The contents of the applications are incorporated by reference in their entirety.

BACKGROUND OF THE INVENTION

1. Field of the Invention

The present invention relates to an apparatus for packaging conductors, such as optical fibers, having connectors for transporting the conductors with the connectors, and to a packaging apparatus to transport conductors having connectors and a method thereof. More specifically, the present invention relates to a method of packaging high conductors count connectors, and a packaging apparatus to transport high conductors count connectors.

2. Related Art

The conventional packaging used for high fiber count (HFC) fiber optic connectors, such as jumpers and pigtails, is applied at the manufacturing facility. The packaging provides a protective cover over the cable assembly breakouts and connector plug to prevent damage during shipping and handling. This packaging is typically sealed in the factory. The current method of installing the fiber optic cable includes opening the high fiber count packaging to perform a continuity check on the cable before the HFC fiber optic cable is installed. However, the conventional HFC fiber optic cable packaging is not easily re-sealable and does not facilitate these type of field inspections.

Accordingly, there remains a need for an improved packaging apparatus and method that facilitates inspections of the cable prior to installation.

SUMMARY OF THE INVENTION

Exemplary embodiments provide a conductor packaging apparatus that facilitates inspection of the cable prior to installation and allows for many different connector configurations to be used without requiring an entirely different packaging apparatus.

One aspect of an exemplary embodiment provides a conductor packaging apparatus for packaging a plurality of conductors including an outer shell comprising two halves; and an inner shell removably disposed between the halves of the outer shell; a plurality of connector attachments disposed on an inner surface of the inner shell, wherein the two halves of the outer shell are movably attached to one another between a closed position in which the connector attachments are enclosed by both the inner shell and the outer shell, and an open position in which the two halves of the outer shell are apart from one another.

The inner shell may include two halves.

The outer shell may include a female portion at one end and a male portion at another end which fits within the female portion for connecting a plurality of assemblies to one another.

The inner shell may be disposed between the female portion and the male portion and does not overlap the female portion or the male portion.

A pulling mechanism may be attached to one end of the outer shell.

A hinge may be disposed between the two halves of the outer shell to hingedly connect the two halves to one another.

A hinge may be disposed between the two halves of the inner shell to hingedly connect the two halves to one another.

The halves of the outer shell may each have a substantial U-shape in cross section and form a hollow cylindrical shape when attached to one another.

The halves of the inner shell may each have a substantial U-shape in cross section and form a hollow cylindrical shape when attached to one another.

An attachment portion may extend from at least one end of the housing, wherein the housing is attachable to a housing of another apparatus.

The attachment portion may limit a number of degrees of freedom of the housing relative to the another apparatus.

The housing may extend along a longitudinal axis and the connecting portions are radially spaced about the longitudinally axis of the housing.

A U-shaped slot may be formed at each end of each half of the inner shell and of each half of the outer shell to define a conductor insertion hole in each end of the inner shell and of the outer shell.

The conductors may be optical fibers.

A conductor packaging assembly may include a plurality of the conductor packaging apparatuses attached to one another in series.

An aspect of another exemplary embodiment provides a method of packaging a bundle in a conductor packaging assembly comprising an outer shell having two halves and an inner shell having two halves, each of the bundles including a plurality of conductors, wherein each conductor includes a connector at a first end thereof, the method including attaching the connectors of the conductors of the bundle to the inner shell of the conductor packaging assembly; closing the two halves of the conductor packaging assembly to abut one another; placing the inner shell with the conductors in the outer shell and attaching the two halves of the outer shell to one another to enclose the inner shell; wherein the conductors of the first bundle extend through a conductor insertion hole formed in the inner shell and through a conductor insertion hole formed in the outer shell.

The method may include gathering the conductors attached to the inner shell at a location beyond an end of the inner shell.

The method may include attaching the inner shell to the outer shell.

BRIEF DESCRIPTION OF THE FIGURES

The following is a brief description of the Figures, in which like elements are referred to with like reference numerals.

DETAILED DESCRIPTION OF THE EXEMPLARY EMBODIMENTS

Exemplary embodiments of the present invention overcome the above disadvantages and other disadvantages not described above. Also, the present invention is not required to overcome the disadvantages described above, and an exemplary embodiment of the present invention may not overcome any of the problems described above.

Figure 1:
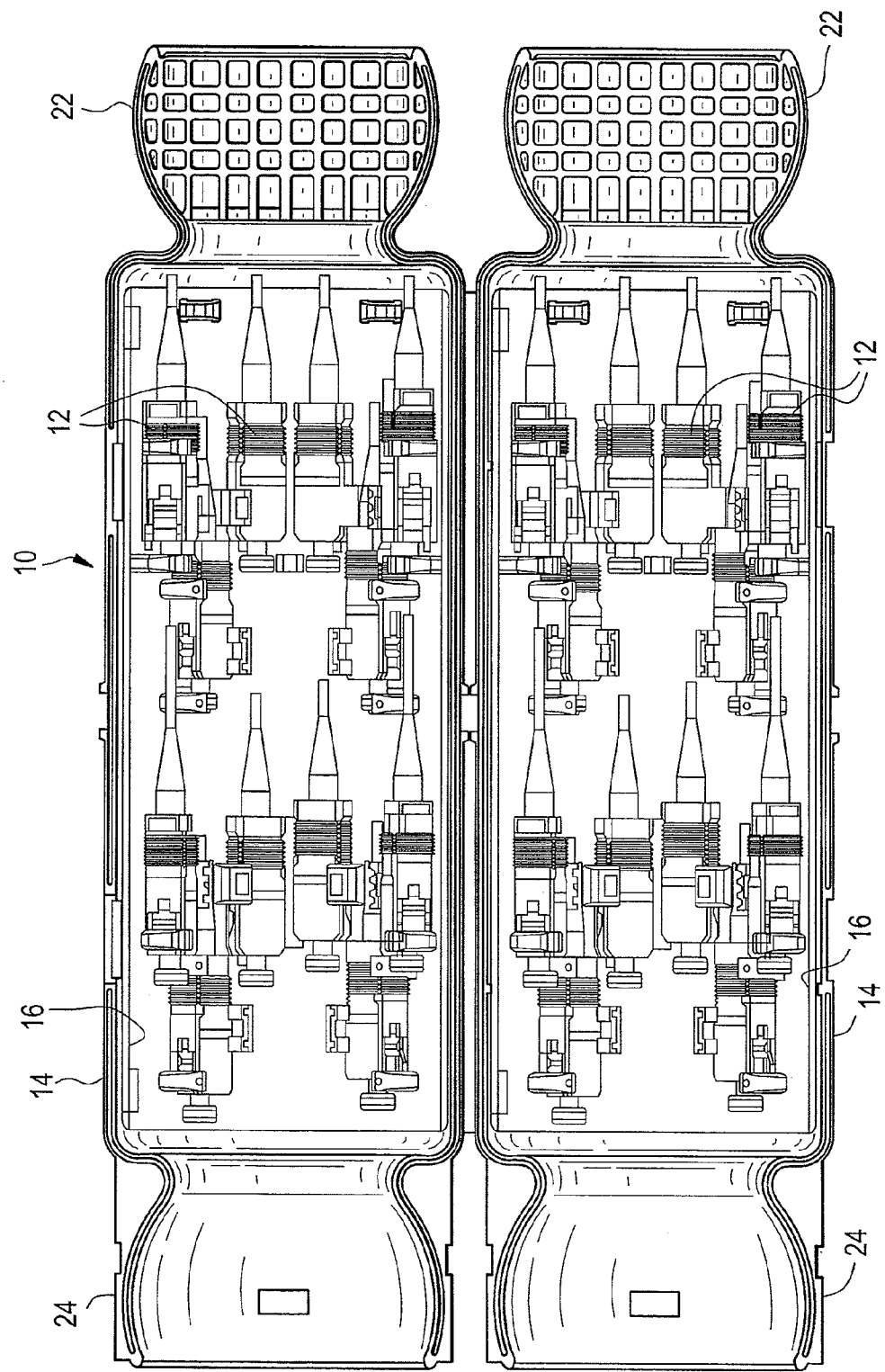
FIG. 1 is front view of an exemplary embodiment of a fiber packaging module in an open position illustrating a plurality of connectors disposed therein.

The embodiments below refer to examples where the conductors 9 are optical fibers. However, embodiments would also be applicable to conductors that are electrical wires. FIG. 1 is perspective view of an exemplary embodiment of a fiber packaging module 10 in an open position illustrating a plurality of connectors 12 disposed therein.

Figure 2:
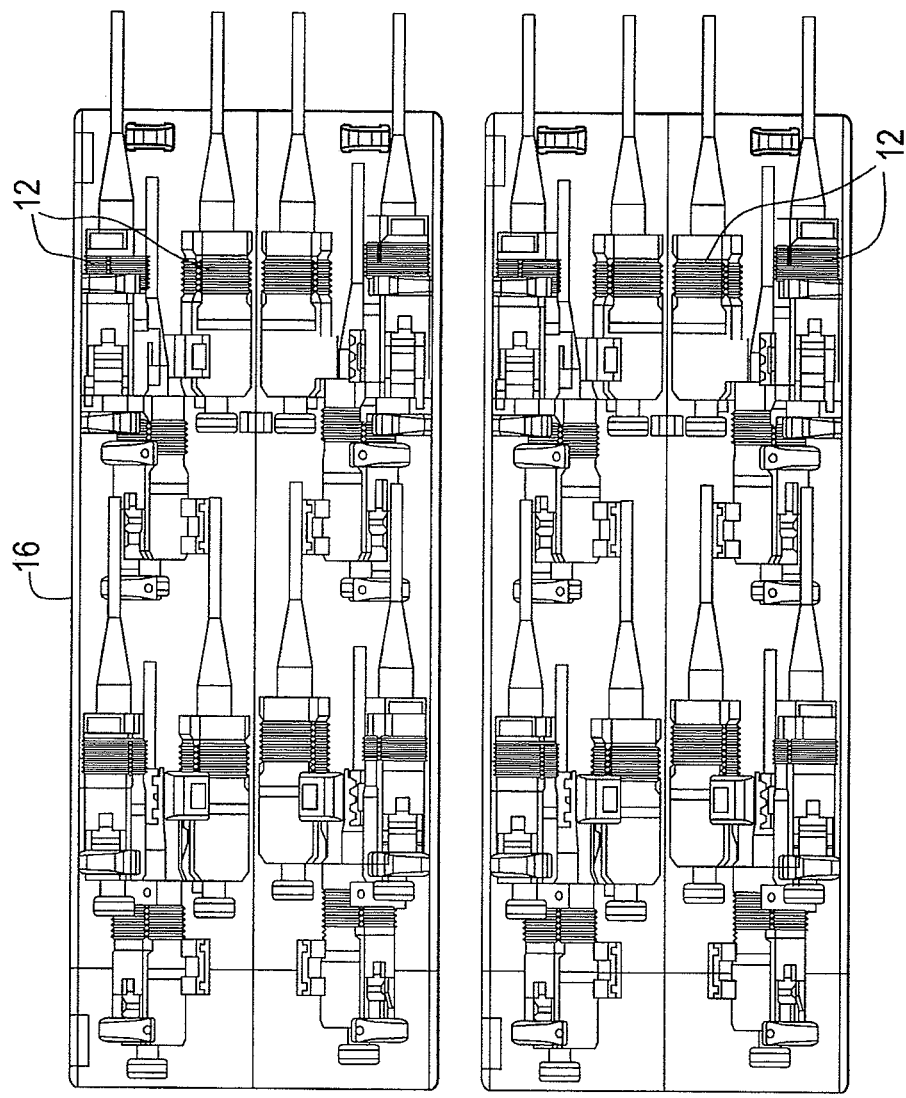
FIG. 2 is a front view of an exemplary embodiment of an inner shell of the module of FIG. 1 illustrating the plurality of connectors disposed therein.
Figure 3:
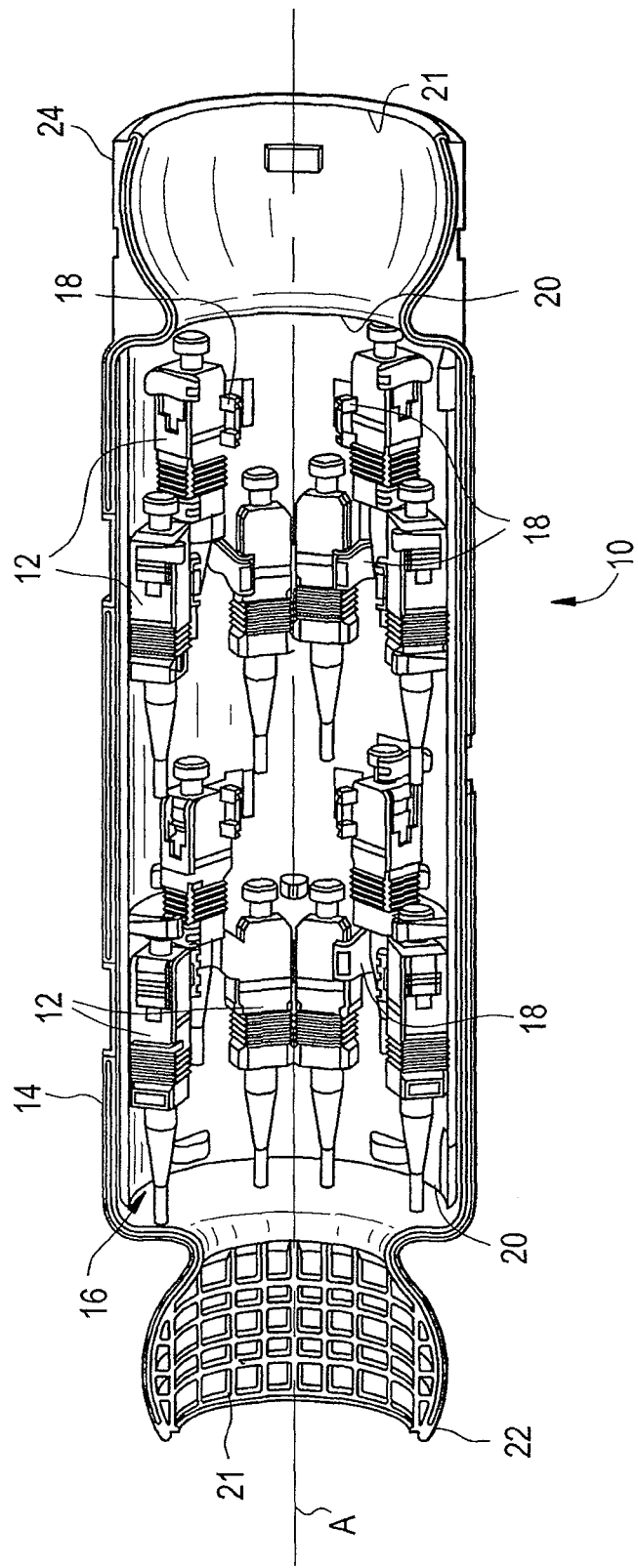
FIG. 3 is an perspective view of another exemplary embodiment of one half of an outer shell and one half of an inner shell illustrating the connectors disposed therein
Figure 4:
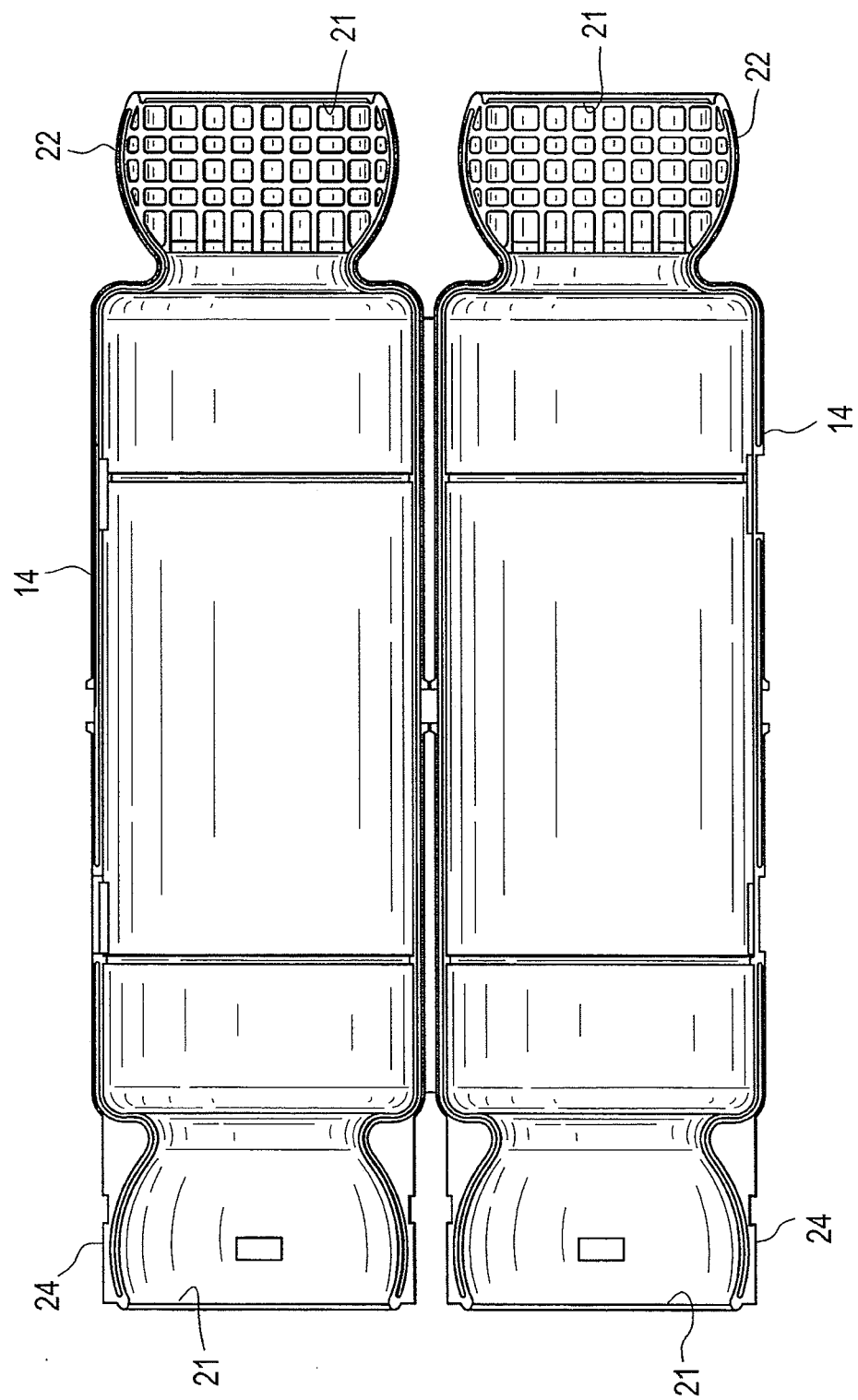
FIG. 4 is a front view of an exemplary embodiment of an outer shell of the module of FIG. 1.
Figure 5:
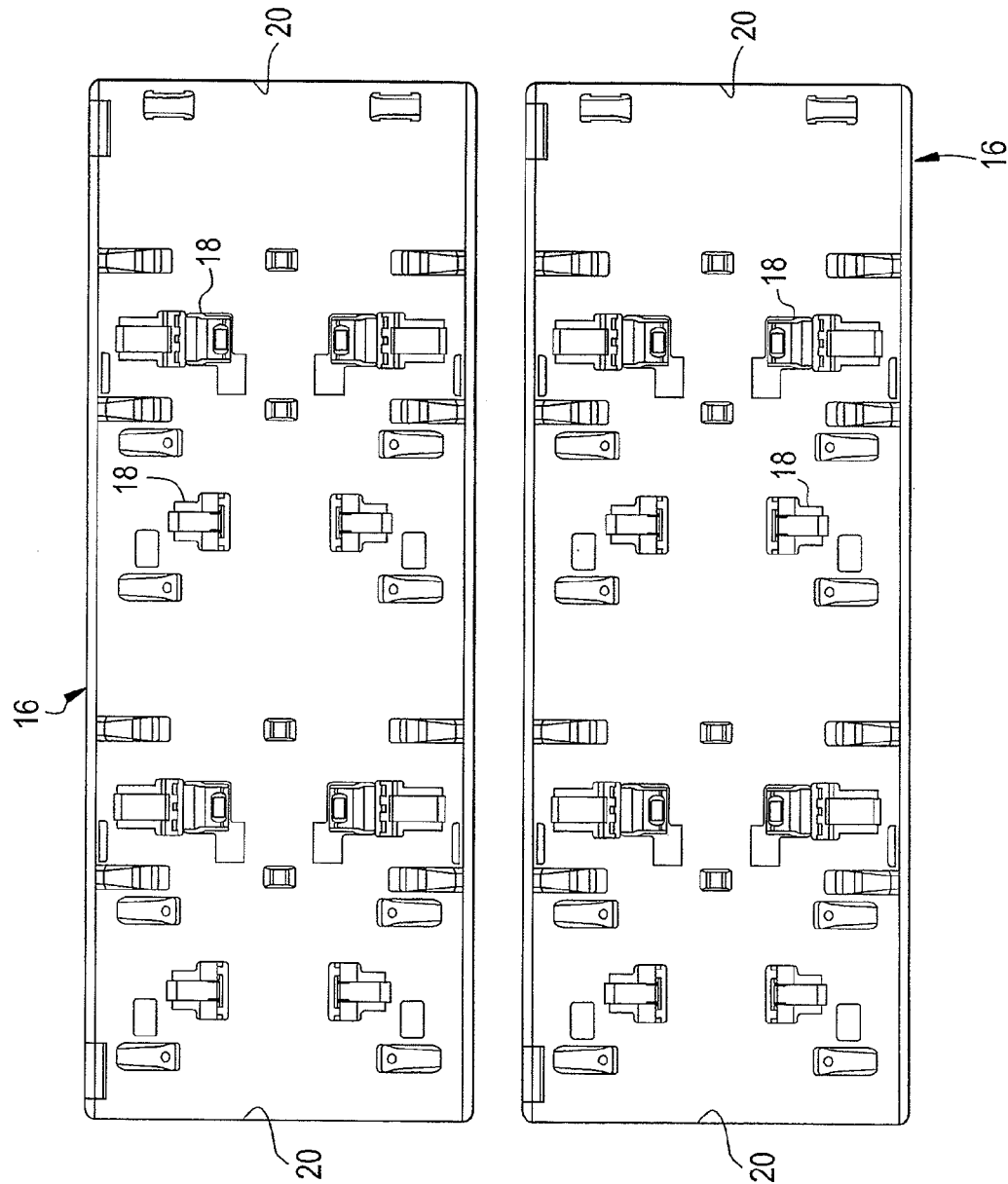
FIG. 5 is a front view of an exemplary embodiment of the inner shell of the module of FIG. 1.

As shown in FIG. 1, the apparatus 10 includes an outer shell 14 and an inner shell 16. The outer shell 14 includes two halves that may be connected to one another by a hinge, as shown in FIG. 1, or may be separate, as shown in FIG. 4. The inner shell 16 includes two halves that may be connected to one another by a hinge, as shown in FIG. 2, or may be separate, as shown in FIG. 5. Each half of the inner shell 16 is installed on each half of the outer shell 14, as shown in FIG. 3, and two halves are faced against one another to form the apparatus 10.

Figure 6:
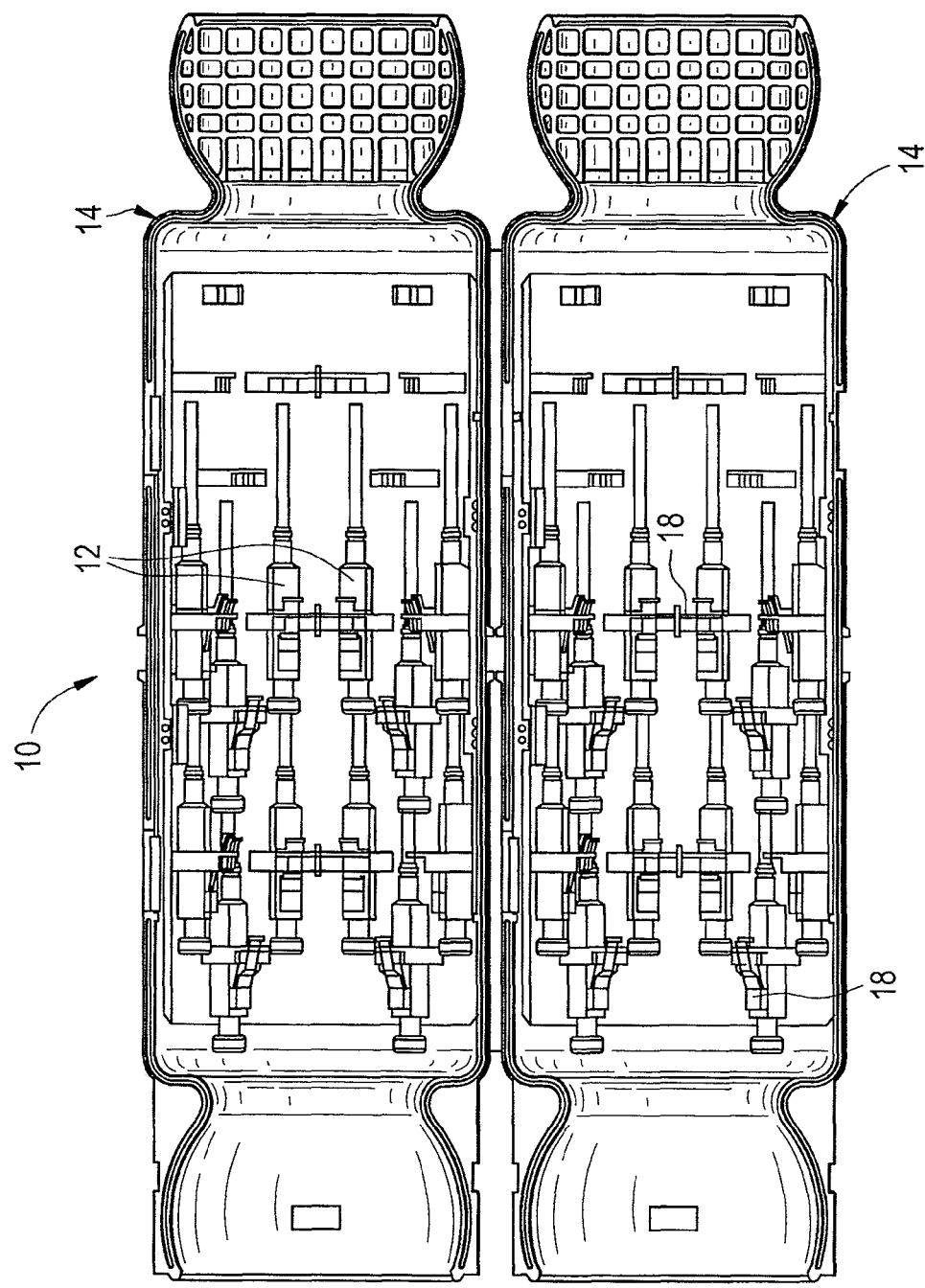
FIG. 6 is a front view of another exemplary embodiment of a fiber packaging module in an open position illustrating a plurality of connectors disposed therein.

As best shown in FIGS. 5 and 6, the inner shell 16 of the apparatus 10 includes a plurality of connector mounts 18 to store a plurality of connectors 12, for example, up to thirty-six connectors. However, the number of connector mounts 18 and respective connectors 12 may be varied as would be generally understood by those of ordinary skill in the art. For example, the exemplary embodiments may store up to twenty-four connectors 12, with twelve connectors 12 in each half of the inner shell 16, or up to thirty-six connectors 12, with eighteen connectors 12 in each half of the inner shell 16.

The two halves of the outer shell 14 are movably attached to one another between a closed position in which the connector mounts 18 are enclosed by both the inner shell 16 and the outer shell 14, and an open position in which the two halves of the outer shell 14 are apart from one another.

The halves of the outer shell 14 each having a substantial U-shape in cross section and form a hollow cylindrical shape when attached to one another. Similarly, the halves of the inner shell 16 each having a substantial U-shape in cross section and form a hollow cylindrical shape when attached to one another. A U-shaped slot is formed at each end of each half of the inner shell 16 and of each half of the outer shell 14 to define a conductor insertion hole 20 in each end of the inner shell 16 and a conductor insertion hole 21 in each end of the outer shell 14.

An attachment portion 22, 24 extends from at least one end of the outer shell 14, wherein the outer shell 14 is attachable to an outer shell 14 of another apparatus 10. The attachment portion 22, 24 limits a number of degrees of freedom of the outer shell relative to the another apparatus 10.

As best illustrated in FIGS. 3 and 4, each module 10 may include a semicircular male portion 22, i.e., a socket portion, at one end, and a semicircular female portion 24, i.e., a ball portion, at the other end. The male portion 22 and the female portion 24 are formed integrally with the two halves of the outer shell 14 wherein the male portion 22 includes two halves and the female portion includes two halves.

Figure 7:
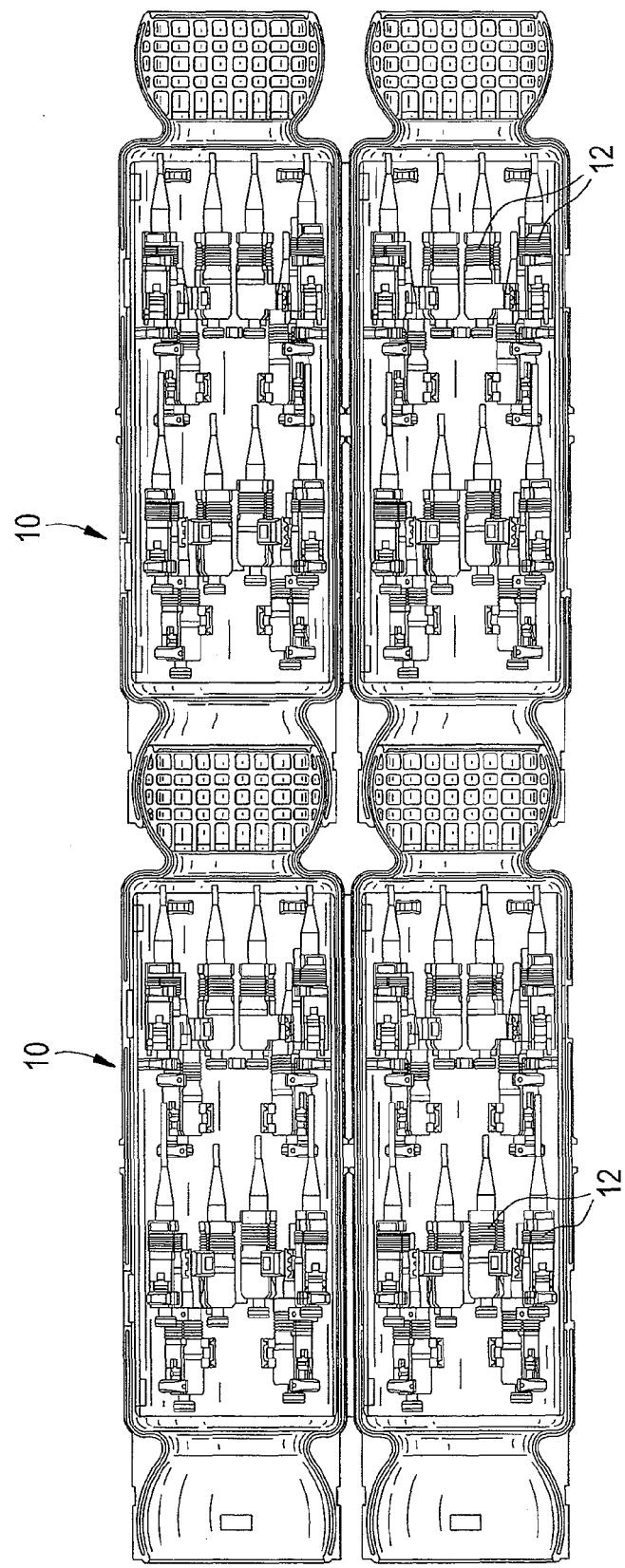
FIG. 7 is a front view of an exemplary embodiment of a fiber packaging apparatus including two fiber packaging modules in an open position.
Figure 8:
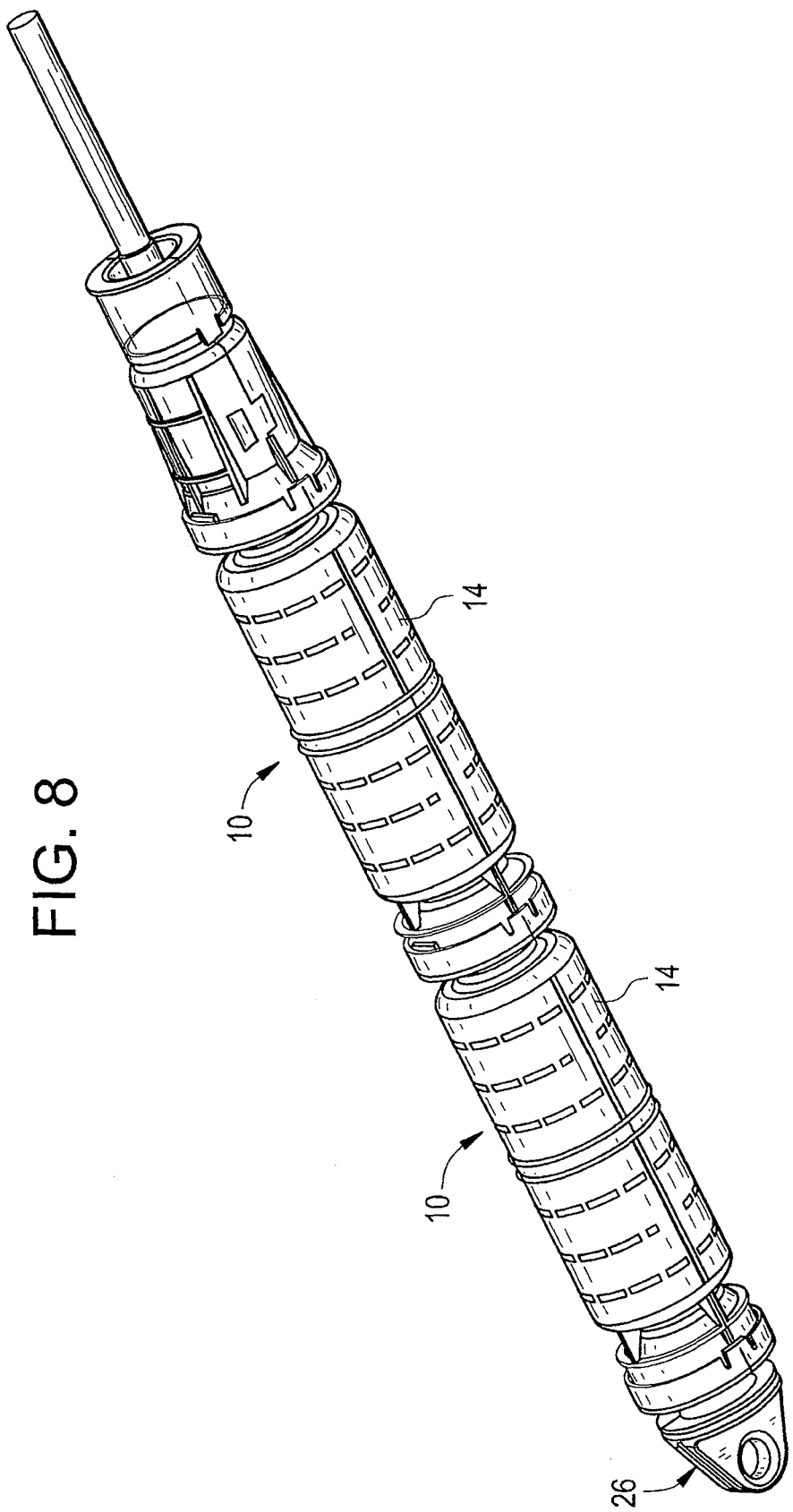
FIG. 8 is a front view of an exemplary embodiment of a fiber packaging assembly including two modules, a pulling mechanism, and a conductor clamp assembly.
Figure 13:
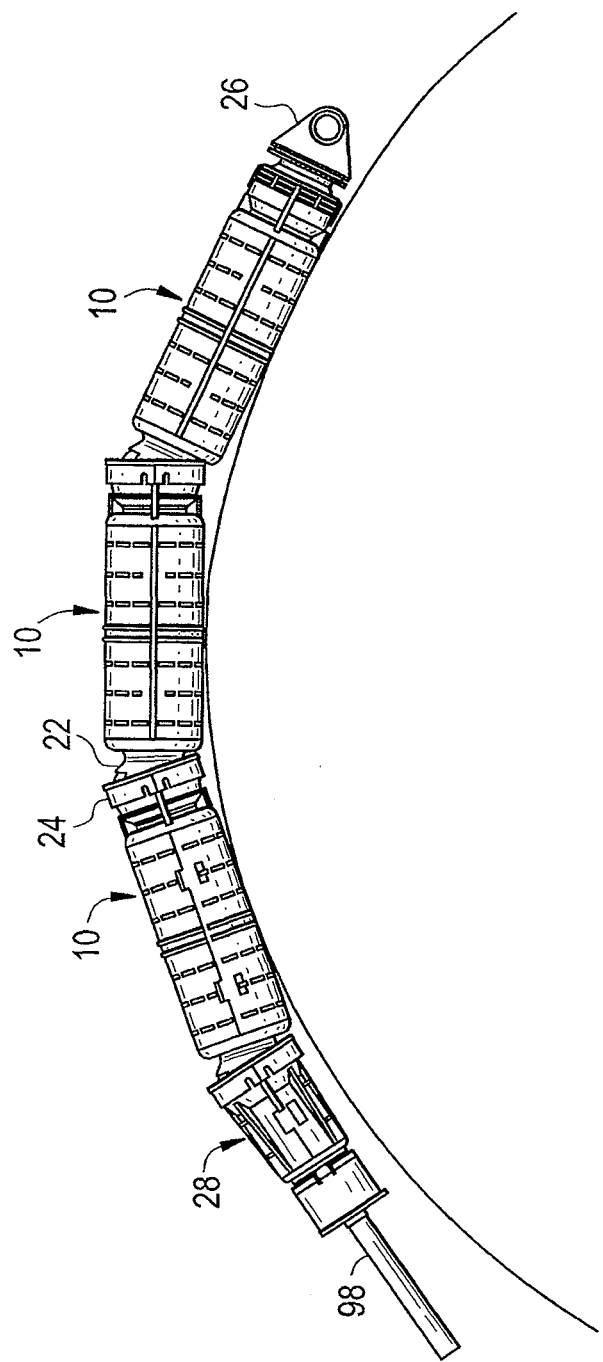
FIG. 13 is a front view of an exemplary embodiment of a fiber packaging apparatus including three outer shells, a pulling attachment attached to one of the outer shells, and a conductor clamp assembly shown in along an arced surface.

As shown in FIG. 7, the male portion 22 of one apparatus 10 may be placed between and fits within two halves of a female portion 24 of another apparatus, whereby two apparatuses 10 may be connected to one another through a ball and socket arrangement. An inner surface of the male portion 22 is concave and an outer surface of the female portion 24 is convex and matches the profile of the concave inner surface of the male portion 22. As such, when the female portion 24 of one apparatus 10 is connected to the male portion 22 of another apparatus 10, as shown in FIGS. 8 and 13, the two connected apparatuses 10 may rotate and bend relative to one another and thereby the connected apparatuses 10 can easily wrap around an arc of a cable reel or follow a bend (schematically shown in FIG. 13) of a conduit or cable tray.

The inner shell 16 is disposed between the male portion 22 and the female portion 24 along a longitudinal axis A of the apparatus and does not overlap the female portion 24 or the male portion 22.

Figure 9:
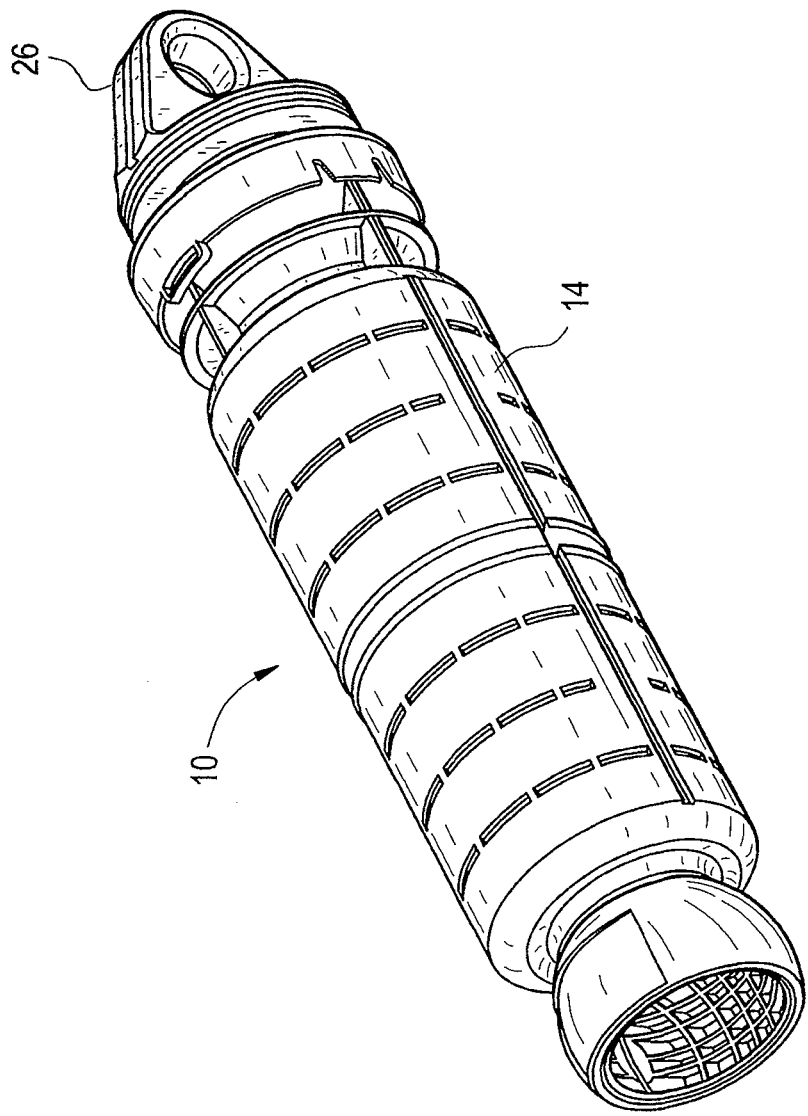
FIG. 9 is a perspective view of an exemplary embodiment of a fiber packaging module and a pulling attachment.
Figure 10:
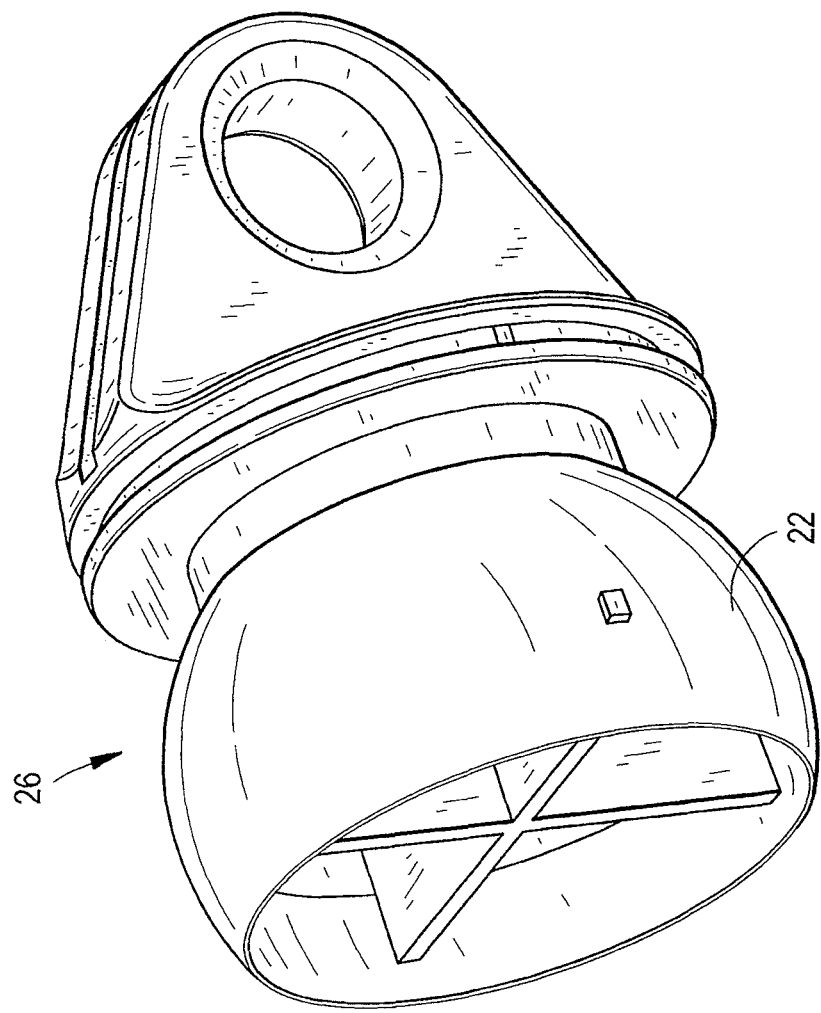
FIG. 10 is a perspective view of a pulling attachment.

As shown in FIGS. 9 and 10, a pulling mechanism 26 may be attached to one end of the apparatus 10. The pulling mechanism 26 may include, for example, a hook, a through hole, or any other structure that may be used to pull the module 10, and any modules 10 attached thereto, through a duct, conduit, cable tray or the like. The pulling mechanism 26 includes one of a male portion 22 or a female portion 24 disposed at an end thereof that is attachable to the other of a female portion 24 or the male portion 22 of a module 10. For example, FIG. 10 illustrates the pulling mechanism 26 including a male portion 22 that is attachable to a female portion 24 of a module 10.

Figure 11:
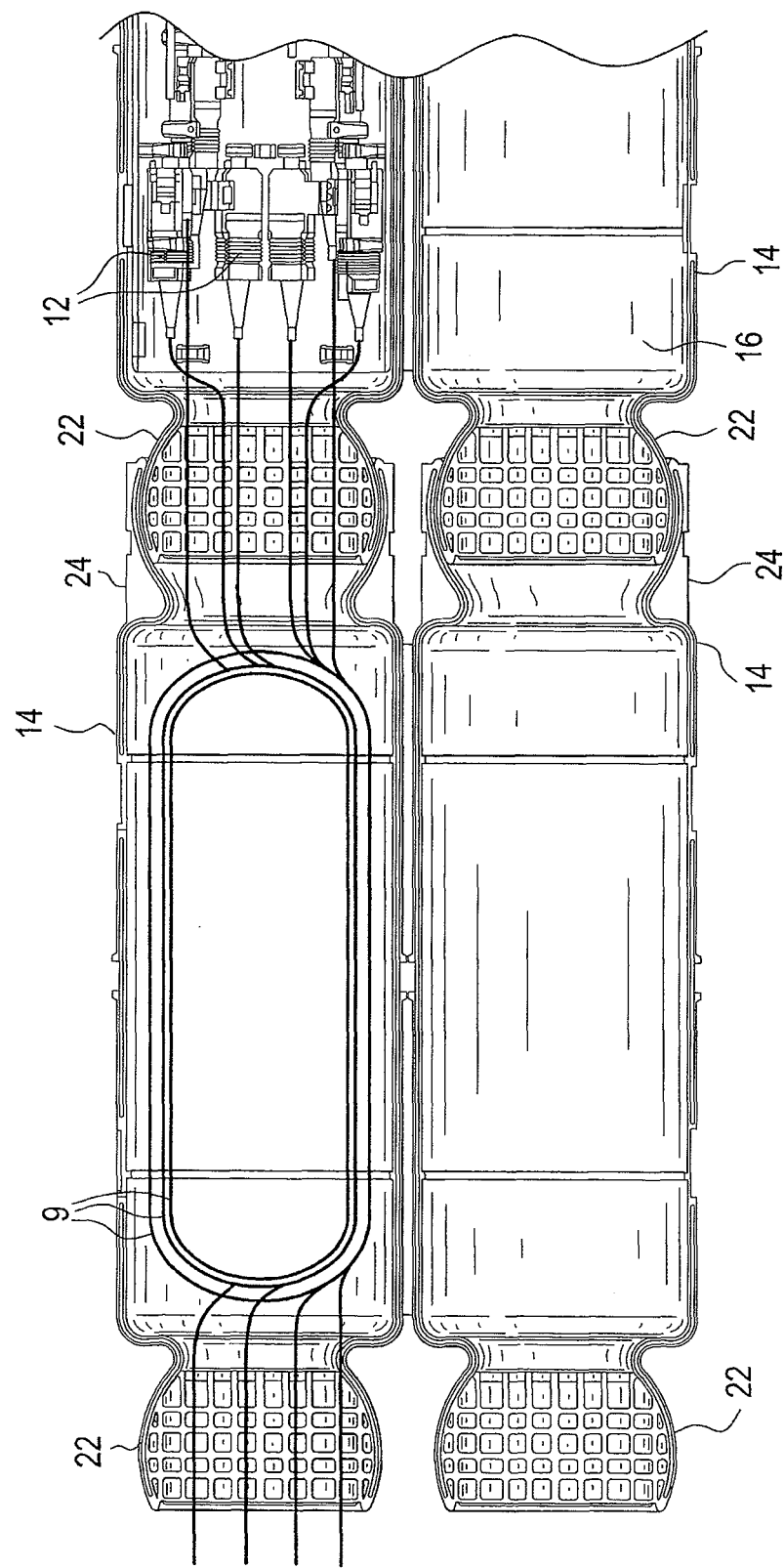
FIG. 11 is a front view of one half of an outer shell used as a slack spool.
Figure 12:
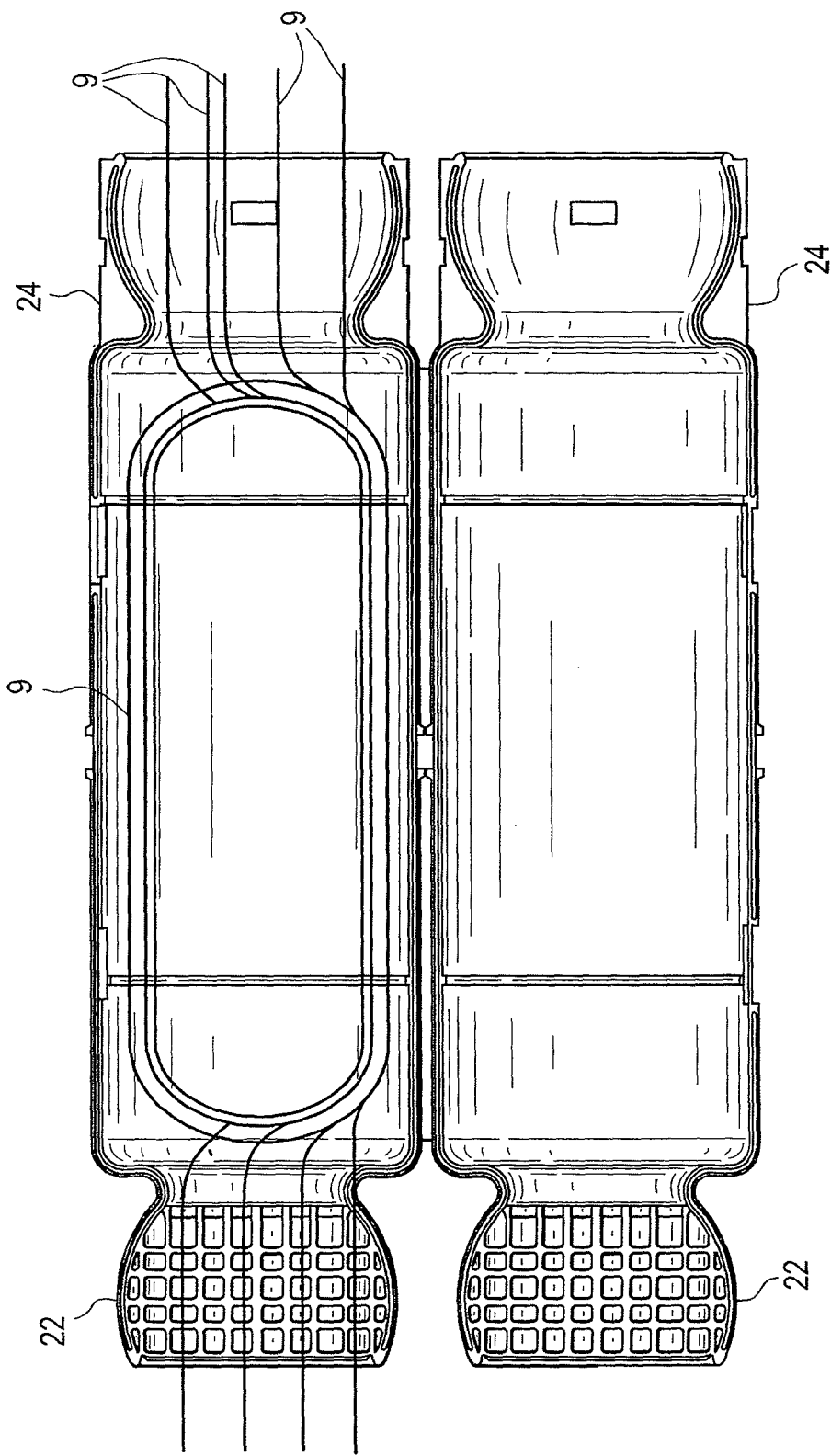
FIG. 12 is a front view of one half of an outer shell used as a take-up spool.

As respectively shown in FIGS. 11 and 12, an outer shell 14 may be used, without the inner shell 16 attached, as a slack spool to take up excess length of the conductors, or as a take-up spool to adjust the lengths of the conductors from multiple modules 10 to provide equal lengths. FIG. 11 illustrates the left-most outer shell 14 without a corresponding inner shell 16, wherein the left-most outer shell 14 may be used as a take-up spool or slack spool for the conductors extending from modules 10 shown in FIG. 11.

As shown in FIGS. 8 and 13-18, a conductor clamp assembly 28 may be attached to one end of the apparatus 10. The conductor clamp assembly 28 may include an insert 30 which is disposed substantially or entirely around a portion of the conductors 9, a clamping shell 32 which has two halves that clamp together around the conductors 9 and the insert 30, and a collar 34 disposed over the clamp shell 32. The insert 30 has a through hole which is dimensioned based on the outer diameter of the conductors 9.

The collar 34 is fitted over an end of the clamping shell 32 to retain the clamping shell 32 in a closed position and to exert pressure onto the insert 30 to thereby deform the insert 30 and to compress the conductors 9. The insert 30 is positioned axially at substantially the same location along the axis A as the collar 34. By this arrangement, the conductors 9 are compressed by the conductor clamp assembly 28 to prevent rotation of the apparatus 10 relative to the conductors 9 and to transfer an axial load to the apparatus 10. The insert 30 may be any structure capable of exerting a compressive force onto the conductors 9.

The clamping shell 32 may include a snap closure 36 to retain the halves of the clamping shell in a closed position.

Figure 14:
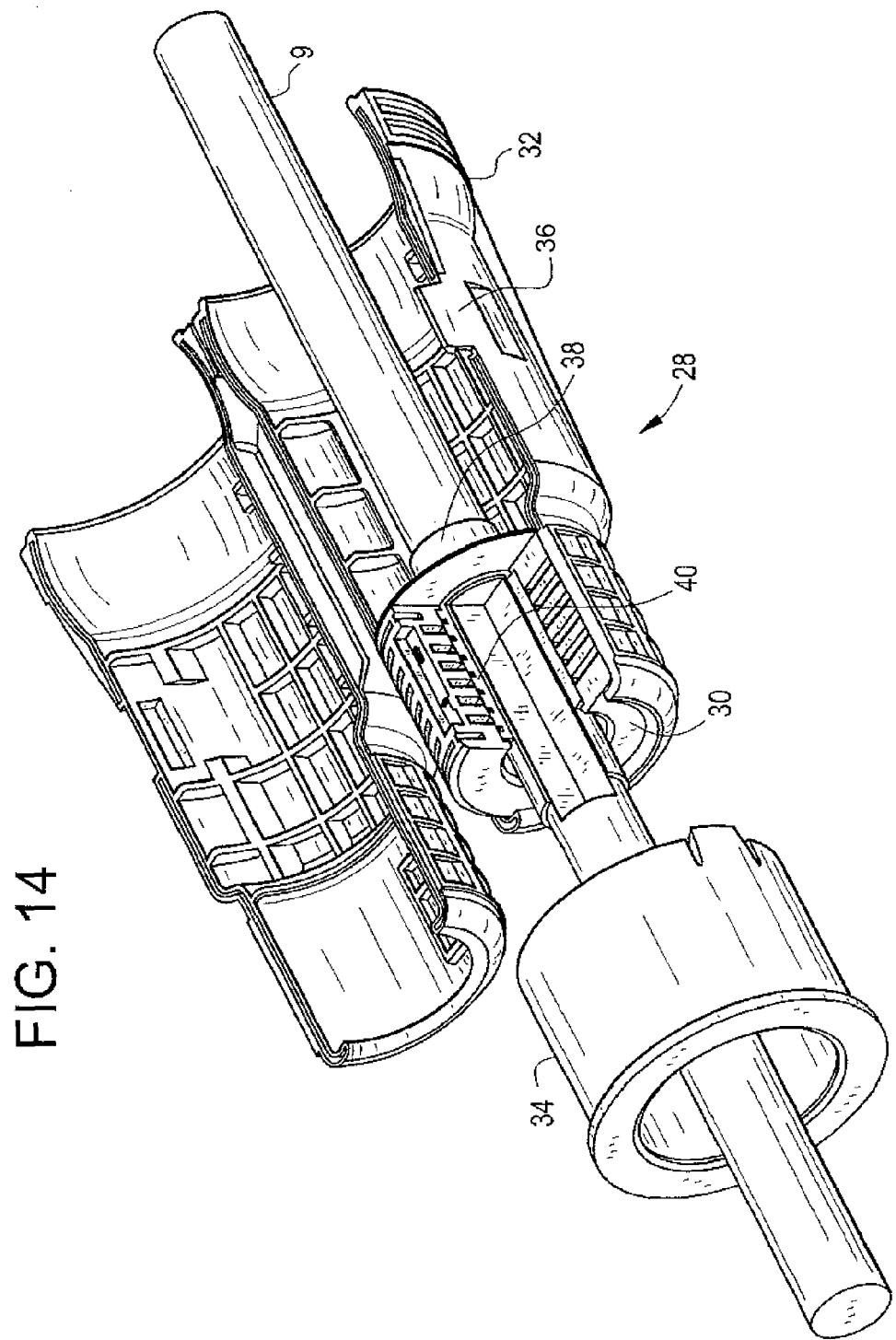
FIG. 14 is a perspective view of an exemplary embodiment of a conductor clamp assembly.
Figure 15:
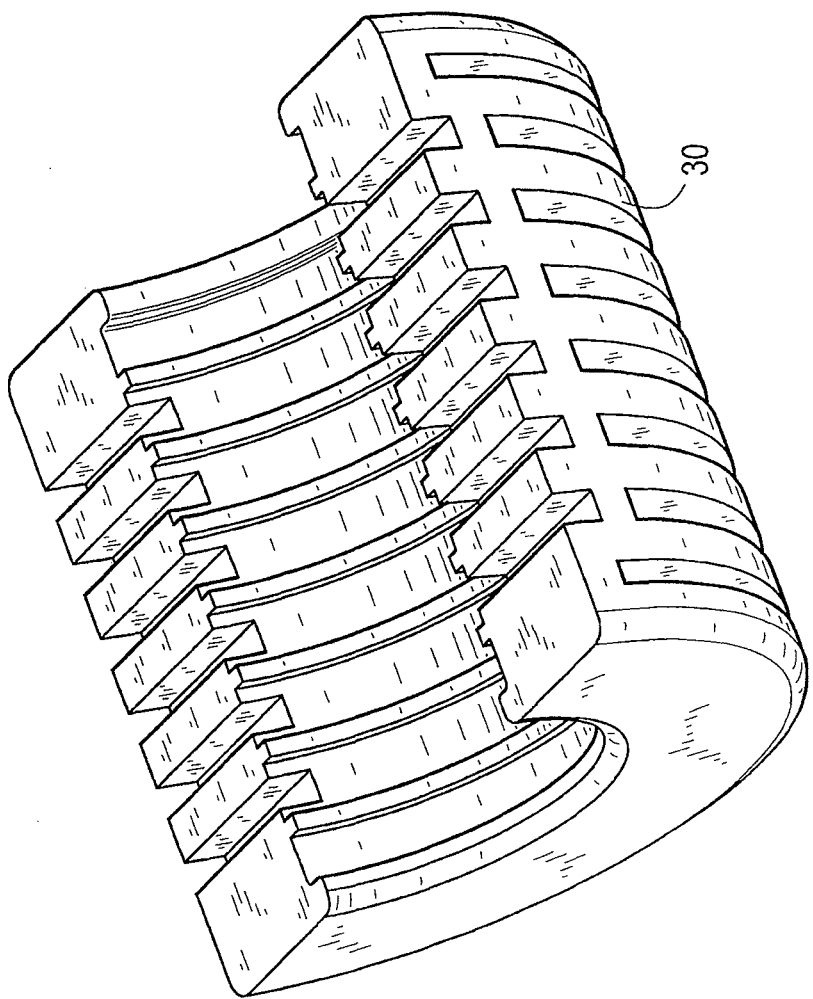
FIG. 15 is a perspective view of one half of an exemplary embodiment of an insert.
Figure 16:
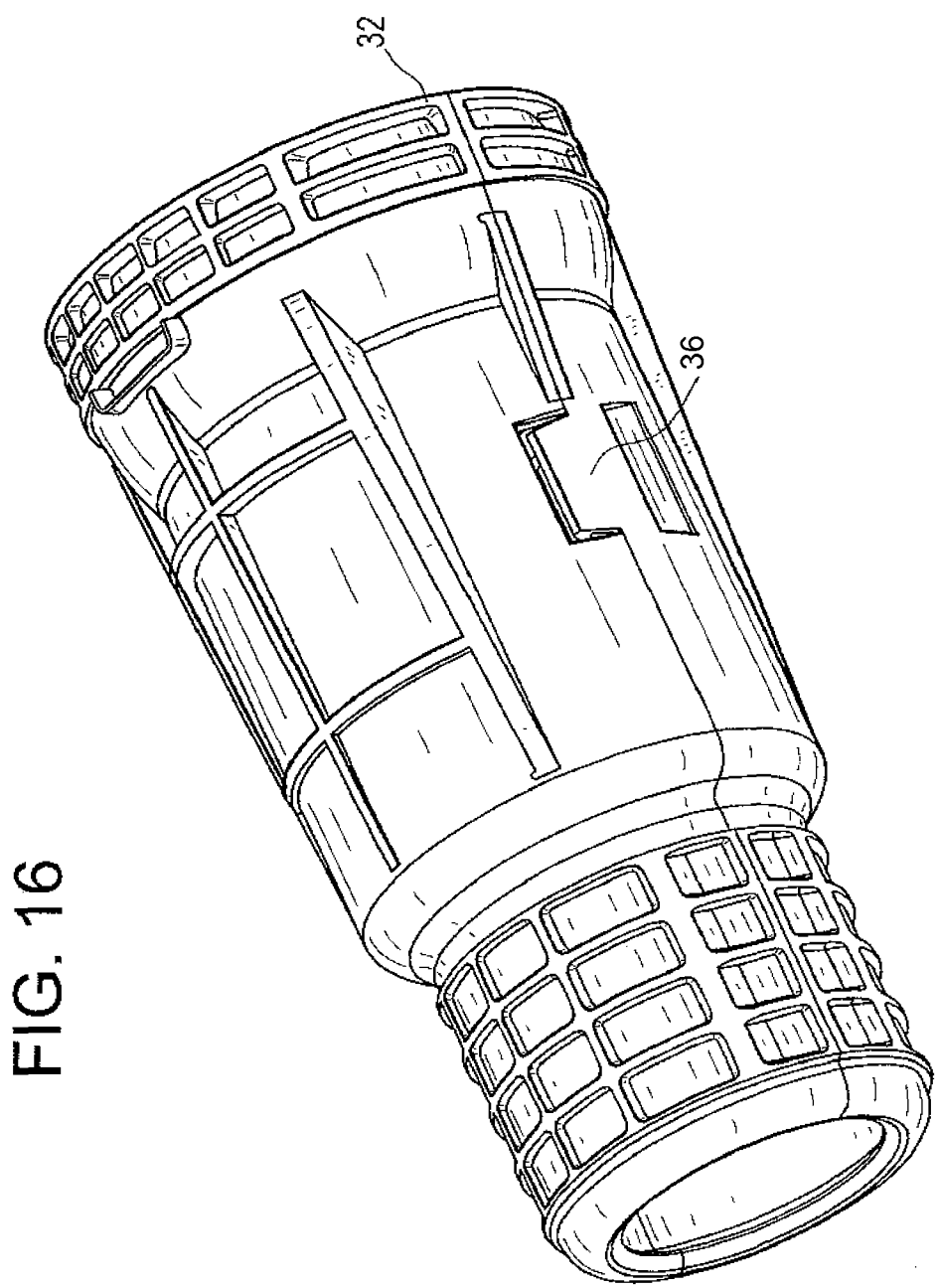
FIG. 16 is a perspective view of an exemplary embodiment of a clamping shell in the closed position.
Figure 17:
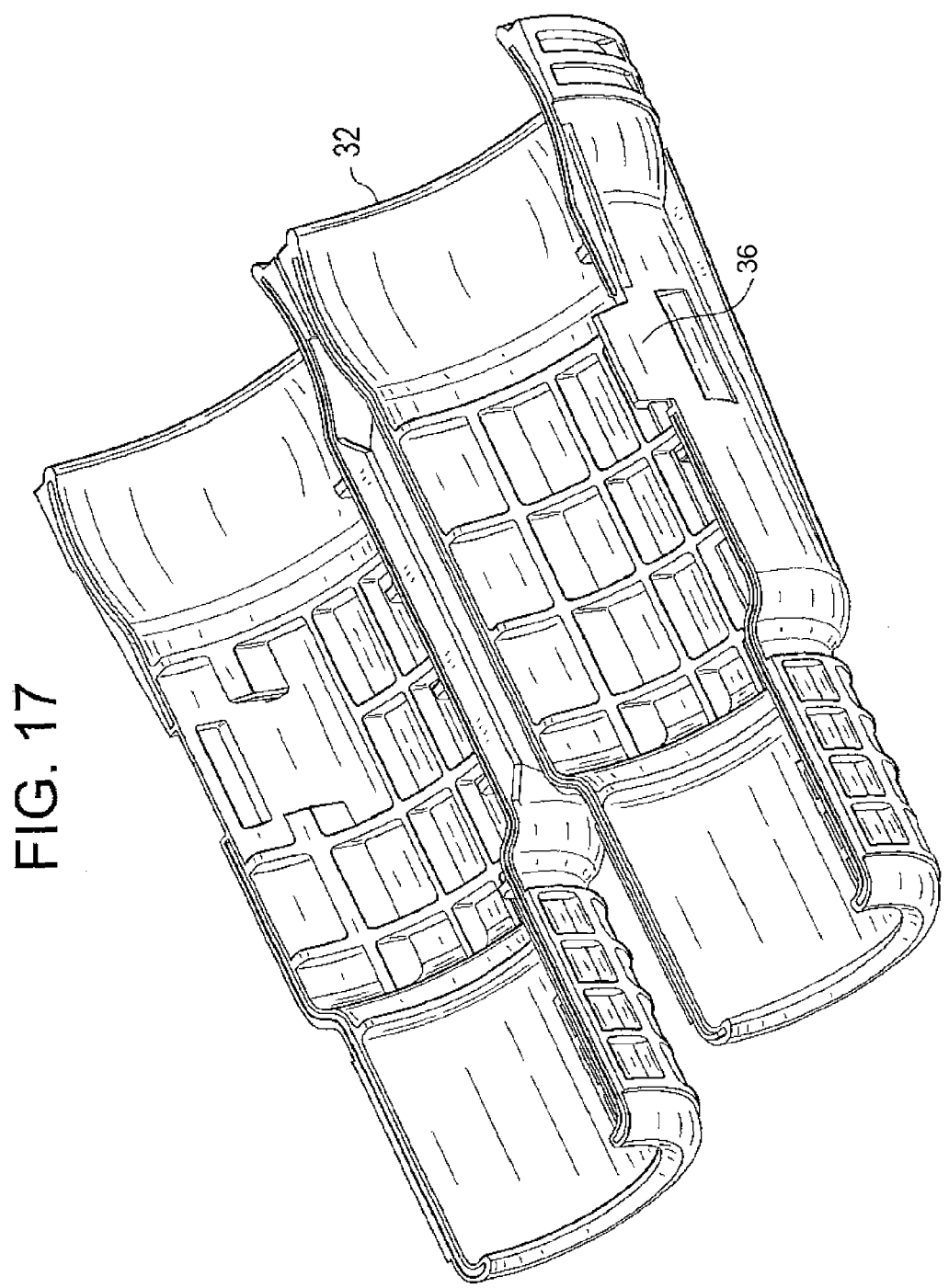
FIG. 17 is a perspective view of an exemplary embodiment of a clamping shell in the open position.
Figure 18:
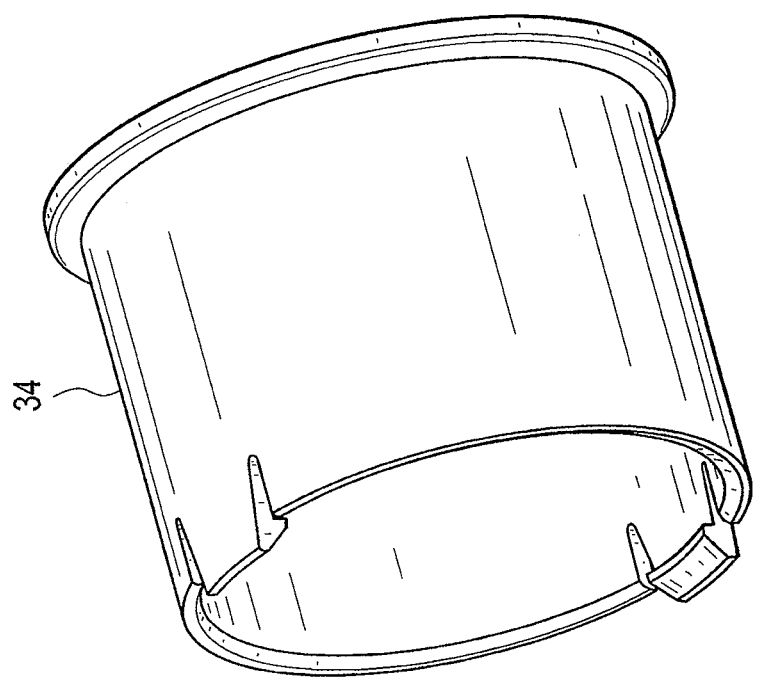
FIG. 18 is a perspective view of an exemplary embodiment of a collar.

A sleeve 38 and/or a layer of tape 40 may be disposed over a portion of the conductors 9 at which the insert 30 of the conductor clamp assembly 28 is disposed. FIG. 14 illustrates a sleeve, for example, made of a thermoplastic polymer such as polyvinyl chloride (PVC) which may be heat shrunk over the conductors 9. The sleeve 38 may be lined on the inner surface with an adhesive. As shown in FIG. 14, the tape 40 may be disposed over the sleeve 38.

In operation, a plurality of the connectors 12 are attached to the connector mounts 18 of a plurality of different inner shells 16, as shown in FIG. 5. Each inner shell 16 is installed in a respective half of an outer shell 14.

The exemplary embodiments of the apparatus 10 provide protection to the connectors 12 and respective fibers by encapsulating the connectors 12 inside the inner shell 16 as well as the outer shell 14, thereby protecting these components from mechanical damage and environmental contamination during installation. Furthermore, since the inner shell 16 is removable, an inner shell 16 may be customized for a plurality of common types of connectors, such as simplex SC, simplex FC, simplex ST, simplex LC, duplex SC, and duplex LC, for example. The inner shell 16 can be unique to each connector configuration or may be a hybrid of one or more types of connectors combined in a single inner shell 16, which each may be used with the same outer shell 14.

Exemplary embodiments of the packaging apparatus allows the module to be easily opened and closed as needed for field inspections while simultaneously protecting the fiber to connectors and fibers from mechanical damage and environmental contamination during installation. Exemplary embodiments of the apparatus may be used as a take-up spool to manage the slack length difference between subunits of a high fiber count fiber optic cable assembly, and may be used with or without the inner spool to provide alternative packaging arrangements based on the use. Exemplary embodiments allow for convenient marking and identifying of the individual connector positions and subunits, thereby providing easier and more efficient fiber connector identification when the connectors are unpacked and placed into service by the installer. The exemplary embodiments may be easily recycled and thus are more environmentally friendly. For example, the apparatuses may be reused as needed to return the cable to the factory, or may be inserted into a standard pulling sock by installers in the field. An exemplary embodiment of the packaging assembly allows consecutive apparatuses to be wrapped around the arc of a cable reel or follow the normal bend of a conduit or cable tray. Exemplary embodiments may be easily pulled through a duct, conduit, or cable tray.

Although the above exemplary embodiments have been described, they are not limiting, and it will be understood by those skilled in the art that the present invention should not be limited to the described exemplary aspects and embodiments, but that various changes and modifications can be made within the spirit and scope of the present invention.

What is claimed is:

1. A conductor packaging apparatus for packaging a plurality of conductors, the apparatus comprising:
   an outer shell comprising two halves; and
   an inner shell removably disposed between the halves of the outer shell;
   a plurality of connector mounts disposed on an inner surface of the inner shell;
   wherein the two halves of the outer shell are movably attached to one another between a closed position in which the connector mounts are enclosed by both the inner shell and the outer shell, and an open position in which the two halves of the outer shell are apart from one another;
   wherein the inner shell comprises two halves; and
   wherein the halves of the inner shell each have a substantial U-shape in cross section and form a hollow cylindrical shape when attached to one another.

2. The apparatus according to claim 1, further comprising a pulling mechanism attached to one end of the outer shell.

3. The apparatus according to claim 1, further comprising a hinge disposed between the two halves of the outer shell to hingedly connect the two halves to one another.

4. The apparatus according to claim 1, further comprising a hinge disposed between the two halves of the inner shell to hingedly connect the two halves to one another.

5. The apparatus according to claim 1, wherein the halves of the outer shell each have a substantial U-shape in cross section and form a hollow cylindrical shape when attached to one another.

6. The apparatus according to claim 1, further comprising an attachment portion extending from at least one end of the outer shell, wherein the outer shell is attachable to an outer shell of another apparatus.

7. A conductor packaging apparatus for packaging a plurality of conductors, the apparatus comprising:
   an outer shell comprising two halves; and
   an inner shell removably disposed between the halves of the outer shell;
   a plurality of connector mounts disposed on an inner surface of the inner shell; and
   an attachment portion extending from at least one end of the outer shell;
   wherein the two halves of the outer shell are movably attached to one another between a closed position in which the connector mounts are enclosed by both the inner shell and the outer shell, and an open position in which the two halves of the outer shell are apart from one another;
   wherein the outer shell is attachable to an outer shell of another apparatus; and
   wherein the attachment portion limits a number of degrees of freedom of the outer shell relative to the another apparatus.

8. A conductor packaging apparatus for packaging a plurality of conductors, the apparatus comprising:
   an outer shell comprising two halves; and an inner shell removably disposed between the halves of the outer shell;

a plurality of connector mounts disposed on an inner surface of the inner shell; and an attachment portion extending from at least one end of the outer shell;

wherein the two halves of the outer shell are movably attached to one another between a closed position in which the connector mounts are enclosed by both the inner shell and the outer shell, and an open position in which the two halves of the outer shell are apart from one another;

wherein the outer shell is attachable to an outer shell of another apparatus; and wherein the attachment portion comprises a female portion at one end of the outer shell and a male portion at another end of the outer shell which fits within a female portion of an outer shell of another apparatus.

9. The apparatus according to claim 8, wherein the inner shell is disposed between the female portion and the male portion and does not overlap the female portion or the male portion.

10. The apparatus according to claim 1, wherein the inner shell extends along a longitudinal axis and the connector mounts are circumferentially spaced about the longitudinal axis of the inner shell.

11. The apparatus according to claim 1, wherein a U-shaped slot is formed at each end of each half of the inner shell and of each half of the outer shell to define a conductor insertion hole in each end of the inner shell and of the outer shell.

12. The apparatus according to claim 1, wherein the conductors are optical fibers.

13. A conductor packaging assembly comprising:

a plurality of conductor packaging apparatuses, each of which comprise:

an outer shell comprising two halves; and an inner shell removably disposed between the halves of the outer shell;

a plurality of connector mounts disposed on an inner surface of the inner shell;

wherein the two halves of the outer shell are movably attached to one another between a closed position in which the connector mounts are enclosed by both the inner shell and the outer shell, and an open position in which the two halves of the outer shell are apart from one another; and wherein each of said conductor packaging apparatuses are attached to one another in series.

14. The conductor packaging assembly according to claim 13, further comprising a conductor clamp assembly disposed at one end of one of the plurality of conductor packaging apparatuses which compresses the conductors.

* * * * *